July 13, 1954
F. G. LOGAN
2,683,853
POWER TRANSMISSION
Filed Nov. 29, 1951
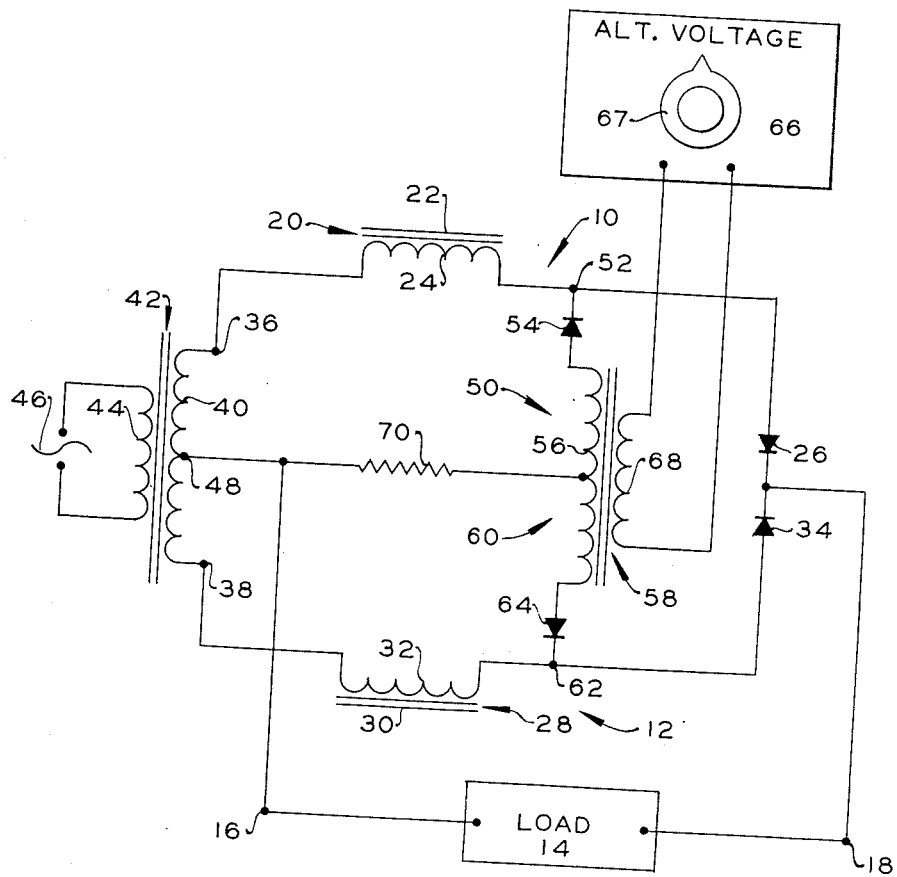
INVENTOR.
FRANK G. LOGAN
BY
ATTORNEY Patented July 13, 1954

2,683,853

UNITED STATES PATENT OFFICE 2,683,853

POWER TRANSMISSION

Frank G. Logan, Glendale, Mo., assignor to Vickers Incorporated, Detroit, Mich., a corporation of Michigan Application November 29, 1951, Serial No. 258,776

11 Claims. (Cl. 321—25)

This invention relates to power transmission, and more particularly to magnetic amplifier control.

Generally, saturable reactors utilized in magnetic amplifiers employ saturation control windings on the same core as the main or reactance winding. Although there are many magnetic amplifier applications where a fast control response is desirable, it is well known that control windings have inductance and by their very nature tend to introduce time delay in the control circuit, thus increasing response time. Also, since both main and control windings are carried by the same core and are usually wound through the same core windows, the core and window space must be enlarged beyond the size required for only the main reactance winding for any given power requirements. A reduction in core size for any given power requirement is always desirable from space and economic standpoints. In accordance with the present invention, magnetic amplifier control is effected without a control winding thus providing speedier response and smaller core size.

The invention herein embraces control of self-saturating magnetic amplifiers by employing a properly phased alternating voltage to oppose desaturating current derived from the supply alternating voltage at the power input and supplied to the reactance winding during the non-conductive or inactive period of a half wave rectifier in series with the reactance winding of a self-saturating reactor circuit.

It is therefore an object of this invention to provide a new and useful magnetic amplifier.

Another object is to provide a magnetic amplifier with an improved control response time for the amplification of alternating current signals.

Another object is to provide a novel alternating current control circuit for self-saturating reactor circuits.

Another object is to provide a magnetic amplifier employing a smaller than usual core size for a given power need.

A further object of the invention is a saturable reactor circuit wherein saturation may be controlled by an alternating current signal without a control coil on the reactor.

Further objects and advantages of the present invention will be apparent from the following description, reference being had to the accompanying single figure drawing wherein a diagram of a preferred form of the invention is clearly shown.

The circuit illustrated is a self-saturating, full wave, direct current output, magnetic amplifier.

The term "self-saturating magnetic amplifier" has an accepted meaning in the art and refers to a circuit in which periodic, unidirectional current pulses flow through the reactance or output winding of a saturable core reactor resulting in direct current core premagnetization and self-saturation. Where the power supplied to the amplifier is alternating current, the intermittent unidirectional current through the reactance winding is provided by a rectifier having cyclic active and inactive periods, it being conductive during the active periods and less conductive or nonconductive during the inactive periods. The rectifier is always in series with the reactance winding, and neglecting leakage, if any, allows periodic, unidirectional, current pulses to flow in the reactance winding during the conductive or active periods of the rectifier thereby resulting in the reactor having direct current premagnetization during the inactive periods of the rectifier and to "fire" or go into saturation during the active periods of the rectifier. Magnetic saturation resulting from direct current premagnetization obtained as a result of intermittent, unidirectional, current pulses passing through the reactance winding is known as self-saturation. In the ideal and otherwise uninfluenced circuit, this premagnetization is the point of residual magnetism of one polarity. Hereinafter, current flowing through the reactance winding in the direction which provides or aids the premagnetization will be referred to as saturating current, and the direction of such flow shall be referred to as the saturating direction. On the other hand, current which flows through the reactance winding in a direction to oppose the premagnetization will be referred to as desaturating current; and the direction of its flow, the desaturating direction.

The angle or point during the conductive periods of the rectifier at which a self-saturating reactor fires (goes into saturation), is dependent on the premagnetization level during the inactive period. The higher the premagnetization, the earlier the firing point and the longer the load current conduction period during the active period of the rectifier.

As shown in the diagram, a pair of self-saturating reactor branches 10 and 12, operable on alternate half cycles of an applied alternating voltage, cooperate to supply full wave direct current to a load 14 connected to the output terminals 16 and 18 of the amplifier. Branch 10 includes a saturable reactor 20 having a saturable magnetic core 22, and a reactance winding 24 connected in series with a unidirectional device 26, such as a dry plate rectifier. Branch 12 has similar components; reactor 28, core 30, reactance winding 32, and rectifier 34. Rectifiers 26 and 34 are hereinafter referred to as power rectifiers.

At one end, branches 10 and 12 are connected to the amplifier output terminal 18, while at the other end the branches are connected to opposite sides 36 and 38 of the secondary winding 40 of a transformer 42, whose primary winding 44 is connected to a source of alternating voltage 46. The other output terminal 16 is connected to a center tap 48 of the secondary winding 40. Rectifiers 26 and 34 are poled to supply full wave rectified current to the load 14.

Each reactance winding is subjected to unidirectional intermittent current in half wave pulses, thus self-saturating the reactor core to a degree of magnetic saturation depending on the electrical and magnetic characteristics of the circuit components. The output of the amplifier is controlled by the impedances in the branches 10 and 12 which in turn are determined by controlling the magnetic saturation in the reactors. Magnetic saturation may be controlled by changing the core premagnetization. This is accomplished in each of the branches by providing a path through which desaturating current derived from the power input circuit can flow through the reactance winding during the nonconducting or inactive portion of the rectifying cycle in that branch, and controlling the value of the desaturating current with an alternating signal voltage connected effectively in series in the control path and phased to oppose the voltage tending to produce the desaturating current. The higher the alternating signal voltage, the greater is the opposition to the desaturating current, and accordingly the greater is the reactor output. Conversely, as the signal voltage is reduced and approaches zero, the reactor output will decrease and approach cut-off or minimum output of the particular circuit. Thus, the reactor load current is substantially proportional to the signal voltage. The method of control can be changed by making the phase of the signal voltage adjustable, the output with this type of control being proportional to the phase relations between the desaturating current and the signal voltage.

In the illustrated embodiment, control is effected by a control circuit which, with respect to the power input circuit, shunts the current from the rectifier 26 and the output terminals 16 and 18 on one half cycle of the supply voltage from the source 46 applied to the power input circuit, and rectifier 34 and the output terminals on the other half cycle. The path of desaturating current in the control circuit by-passes the power rectifiers 26 and 34 during their respective inactive periods. One section 50 of the control circuit, connected between the center tap 48 and a junction 52, provides a desaturating current path from the power input to the reactance winding 24, and includes a unidirectional device 54 in circuit with the upper half of the secondary winding 56 of a transformer 58. Another section 60 of the control cirfcuit, connected between the center tap 48 and a junction 62, forms a path for a desaturating current from the power input to reactance winding 32 and includes the lower half of the transformer secondary 56 serially connected with a unidirectional device 64. A source of control alternating voltage 66, preferably synchronous with the alternating voltage supplied to the amplifier power input from the source 46, is connected to the primary winding 68 of the transformer 58, thus effectively placing the output of the alternating voltage source 66 in series with each of the sections 50 and 60 of the control circuit. A control 67 is provided to adjust the output of the source 66, in amplitude, or phase, or both. The unidirectional devices 54 and 64 may be dry plate rectifiers and may be referred to as blocking rectifiers to differentiate from the power rectifiers 26 and 34. A current limiting resistor or other suitable impedance device 70 may be inserted in series with the control circuit, if desired. Such a device may or may not be necessary, depending upon the characteristics of the circuit components, the load, and the desired objects.

For maximum control effect the alternating voltage derived from the source 66 and interposed in the path of desaturating current should be phased to oppose the potential producing the desaturating current. It will be noted that the rectifiers 54 and 26 are oppositely related to each other with respect to the winding 24 and to voltages supplied by transformer 42, and rectifiers 64 and 34 are oppositely related to each other with respect to the winding 32 and to voltages supplied by the transformer 42, thus preventing reactor output or saturating current from flowing through either section of the control circuit during the conductive half cycle of its associated branch and power rectifier, i. e., when the associated branch is active in supplying load current.

Operation of the amplifier shown is conveniently analyzed by following the effect of each half cycle of alternating voltage supplied to the transformer 42. For explanatory purposes, it is arbitrarily assumed herein that each of the rectifiers conducts current in the direction of the arrowhead part of the rectifier symbol, the arrowhead itself being symbolic of one of the electrodes of a rectifier, and that such conduction takes place when that electrode is at a positive potential.

When the secondary voltage of the transformer 42 is positive at the upper end 36 of the secondary winding 40, the center tap 48 is negative with respect to the upper end 36 of the secondary winding and positive with respect to the lower end 38. During this half cycle rectifier 34 is not conductive while rectifier 26 is active and allows load current to flow from the power supply through reactance winding 24, power rectifier 26, through load 14, and back to the power input at center tap 48. During the same half cycle, while the branch 12 is inactive in supplying load current, current derived from the power input flows from the center tap 48 through the lower half of the secondary 56, through rectifier 64 and through the reactance winding 32 in a desaturating direction. This tends to reduce the level of premagnetization in the core 30, thereby increasing the reactance of winding 32. For convenience, as hereinbefore stated, current in this direction in a reactance winding is called desaturating current, as opposed to reactor output or saturating current flowing through the reactance winding on the conductive half cycle of its associated power rectifier. On the half cycle that power rectifier 34 is nonconductive, the secondary alternating voltage of transformer 58 is phased to oppose the flow of the desaturating current through the section 60 of the control circuit and the reactance winding 32. For this condition the secondary transformer voltage at the lower end of the secondary winding 56 is negative. Since the control alternating voltage is opposed to the polarity of the voltage producing the desaturating current in the control path, the value of the desaturating current will be determined by the difference in the opposing potentials. The flow of desaturating current through the control circuit path and the reactance winding is therefore controlled by adjusting the magnitude of the control alternating voltage introduced from the source 66 into the control circuit 60. Thus the reactance of the reactor winding is controlled by adjusting the control alternating voltage interposed in the path of the desaturating current.

On the next half cycle of the supply voltage applied to the power input, that is, when the secondary voltage at lower end 38 of the secondary 40 is positive, power rectifier 26 is inactive, while power rectifier 34 is conductive and allows half wave current to flow through the reactance winding 32 into the output circuit and the load. During this nonconducting period of rectifier 26, the control circuit section 50 provides a path, by-passing rectifier 26 and the load, for allowing desaturating current, derived from the alternating voltage supplied to the power input, to flow through winding 24. The path for this current may be traced from the center tap 48, through the upper half of the secondary 56, the rectifier 54, and thence through the reactance winding 24 in a desaturating direction. The polarity of the control voltage from the source 66 is now reversed and it opposes the flow of desaturating current through the control section 50 and the reactance winding 24. Thus the output of the amplifier is controlled by adjusting the magnitude of the control alternating voltage interposed in the path of the desaturating current flowing through the reactance winding of the branch which is at the time inactive in supplying load current.

The control voltage from the source 66 may be adjusted in amplitude or phase, or both, to control the degree of opposition to the desaturating current in the control circuit.

The disclosure of a particular type of self-saturating magnetic amplifier is by way of example only, and the invention may be used in connection with any magnetic amplifier circuit, single phase or polyphase, employing the self-saturating principle. Although the invention eliminates the need for a control winding, auxiliary windings may be employed for supplemental control, if desired. For example, compounding windings may be used to compensate for rectifier leakage and poor performance of low grade core materials.

While the form of embodiment of the invention as herein disclosed constitutes a preferred form, it is to be understood that other forms might be adopted, all coming within the scope of the claims which follow.

What is claimed is as follows:

1. A magnetic amplifier comprising a reactor with a saturable core and a reactance winding, means for affecting the magnetization of said core, said means comprising means for passing intermittent unidirectional current pulses through said winding in one direction, a path for passing intermittent current through said winding in the opposite direction, means for interposing an alternating voltage in said path to oppose passage of the latter current through said winding.

2. A magnetic amplifier comprising a reactor with a saturable core and a reactance winding, means for affecting the magnetization of said core, said means comprising means for passing intermittent unidirectional current pulses through said winding in one direction, a unidirectional path for passing current through said winding in the opposite direction, means for interposing an alternating voltage in said path to oppose passage of the latter current through said winding.

3. A magnetic amplifier comprising a reactor with a saturable core and a reactance winding, means for causing said core to go into saturation, said means including means for passing intermittent unidirectional current pulses through said winding in one direction, a unidirectional path for passing desaturating current through said winding in the opposite direction, means for interposing in said path an alternating voltage phased to oppose voltages tending to produce desaturating current thereby to reduce the flow of desaturating current.

4. A magnetic amplifier comprising a reactor with a saturable core and a reactance winding, means for causing said core to go into saturation, said means including means for passing intermittent unidirectional current pulses through said winding in one direction, said last means including a rectifier connected in series with said winding, a path for passing desaturating current through said winding in the opposite direction, a rectifier in said path oppositely related to said first rectifier with respect to the winding, means for inserting an alternating voltage in said path phased to oppose voltages tending to produce desaturating current.

5. A magnetic amplifier comprising a saturable core reactor with a reactance winding, a rectifier connected in a circuit with said winding for passing intermittent current pulses through said winding in the conducting direction of the rectifier when an alternating voltage is applied to said circuit, a control circuit for passing current derived from said alternating voltage through said winding in a desaturating direction, means for interposing an alternating voltage in said control circuit to oppose the passage of said derived current through said winding, and a rectifier in the control circuit oppositely related to the first rectifier.

6. A magnetic amplifier comprising a power input circuit, an output circuit, an intermediate circuit for transmitting power between the input and output circuits and including a saturable core reactor with a reactance winding and a rectifier connected in series with the winding whereby the winding is subjected to intermittent unidirectional current when an alternating potential is applied to the input circuit, a control circuit for passing through said winding desaturating current derived from said alternating potential, a source of alternating voltage inserted in the control circuit and phased to oppose voltages tending to produce desaturating current, and a unidirectional device in the control circuit oppositely related to said rectifier.

7. A self-saturating reactor circuit comprising an input circuit for receiving alternating voltage, an output circuit connectable to a load, an intermediate circuit for transmitting power from the input to the output circuit, said intermediate circuit including a saturable core reactor with a reactance winding and a rectifier connected in series with the winding for subjecting the winding to intermittent unidirectional current, a control circuit for passing current from said input circuit through said winding in the nonconducting direction of the rectifier, said control circuit having connected in series therewith an alternating voltage source and a unidirectional device oppositely related to said rectifier, the voltage from the latter source being of a phase to oppose current flow in the conducting direction of said unidirectional device when said rectifier is not conducting.

8. A magnetic amplifier comprising a power input circuit, an output circuit, a pair of intermediate circuits for alternately transmitting power from the input circuit to the output circuit when an alternating voltage is applied to the input circuit, each intermediate circuit having a saturable-core reactor with a reactance winding and a half wave rectifier connected in series with the winding, said rectifiers being poled to alternately pass half wave current through the respective windings on opposite halves of the alternating voltage cycle, a control circuit for passing desaturating current derived from said input circuit through each winding when its associated rectifier is inactive, means for inserting in said control circuit an alternating voltage phased to oppose voltages tending to produce desaturating current on both half cycles, and means for preventing the flow of current through said control circuit in a saturating direction with respect to said windings.

9. A magnetic amplifier comprising a saturable-core reactor with a reactance winding, a circuit including said winding and a rectifier connected in series with the winding for passing intermittent unidirectional current pulses through the winding in the conducting direction of said rectifier when an alternating voltage is applied to said circuit, a control circuit for passing current derived from said alternating voltage through said winding in a desaturating direction, said control circuit being in series with said winding and shunted around said rectifier, a source of alternating voltage inserted in the control circuit for opposing the flow of said derived current, and a unidirectional device in the control circuit and oppositely related to said rectifier for preventing the flow of current through said control circuit in a saturating direction with respect to said winding.

10. A magnetic amplifier comprising a power input circuit, an output circuit, a pair of intermediate circuits for alternately transmitting power from the input circuit to the output circuit when an alternating voltage is applied to the input circuit, each intermediate circuit having a saturable-core reactor with a reactance winding and a half-wave rectifier connected in series with the winding, said rectifiers being poled to alternately pass half-wave current through the respective windings on opposite halves of the alternating voltage cycle, a control circuit for passing desaturating current derived from said input circuit through each winding when its associated rectifier is inactive, said control circuit being connected to a circuit point between the winding and the rectifier of the other intermediate circuits and to a circuit point between the winding and the recetifier of the other intermediate circuit, means for inserting in said control circuit an alternating voltage phased to oppose voltages tending to produce desaturating current on both half cycles, and means for preventing the flow of current through said control circuit in a saturating direction with respect to said windings.

11. A magnetic amplifier comprising alternating voltage supply means having opposite side terminals and a center tap, a separate self-saturating reactor branch connected to each of said side terminals, said branches having a common junction, a load connected between said junction and said center tap, each branch including a saturable-core reactor with a reactance winding and a half-wave rectifier connected between the winding and the common junction, said rectifiers being poled in the same direction with respect to said junction, and a control circuit for passing desaturating current derived from said source through each winding when its associated rectifier is inactive, said control circuit having opposite end terminals and a center tap, means connecting said center taps, one of said end terminals being connected to a circuit point between the winding and the rectifier of one of said branches, the other end terminals being connected to a circuit point between the winding and the rectifier of the other branch, a source of alternating voltage inserted in said control circuit for opposing the flow of said desaturating current, and unidirectional means in the control circuit for preventing the flow of current through said control circuit in a saturating direction with respect to said windings.

References Cited in the file of this patent

UNITED STATES PATENTS

| Number | Name | Date |
| --- | --- | --- |
| 1,434,346 | Jonas | Oct. 31, 1922 |
| 1,977,193 | Logan | Oct. 16, 1934 |
| 2,085,061 | Aggers | June 29, 1937 |
| 2,212,229 | Giroz | Aug. 20, 1940 |
| 2,306,998 | Glaesson | Dec. 29, 1942 |
| 2,525,451 | Graves | Oct. 10, 1950 |

FOREIGN PATENTS

| Number | Country | Date |
| --- | --- | --- |
| 953,561 | France | May 23, 1949 |